US008738733B1

(12) United States Patent
Walters et al.

(10) Patent No.: US 8,738,733 B1
(45) Date of Patent: May 27, 2014

(54) DYNAMIC CONTROL SYSTEM FOR MANAGING REDIRECTION OF REQUESTS FOR CONTENT

(75) Inventors: Christopher Kenfield Walters, Seattle, WA (US); Michael R. Brauwerman, Seattle, WA (US); Avram Finkel, Renton, WA (US); Stephan G. Betz, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 695 days.

(21) Appl. No.: 11/861,155

(22) Filed: Sep. 25, 2007

(51) Int. Cl.
*G06F 15/16* (2006.01)
*G06Q 30/00* (2012.01)

(52) U.S. Cl.
USPC ..... 709/218; 709/228; 705/14.49; 705/14.52; 705/14.53

(58) Field of Classification Search
USPC ......... 705/14, 14.49, 14.52, 14.53; 707/1–10; 709/218, 224
See application file for complete search history.

(56) References Cited

U.S. PATENT DOCUMENTS

| 5,446,891 | A | 8/1995 | Kaplan |
| 5,774,123 | A | 6/1998 | Matson |
| 5,848,396 | A | 12/1998 | Gerace |
| 5,870,559 | A | 2/1999 | Leshem |
| 5,958,008 | A | 9/1999 | Pogrebisky |
| 6,012,051 | A | 1/2000 | Sammon, Jr. |
| 6,085,229 | A | 7/2000 | Newman |
| 6,317,722 | B1 | 11/2001 | Jacobi |
| 6,466,970 | B1 | 10/2002 | Lee |
| 6,473,794 | B1 | 10/2002 | Guheen |
| 6,493,702 | B1 | 12/2002 | Adar |
| 6,606,102 | B1 | 8/2003 | Odom |
| 6,629,079 | B1 | 9/2003 | Spiegel |
| 6,636,836 | B1 | 10/2003 | Pyo |
| 6,658,568 | B1 | 12/2003 | Ginter |
| 6,735,572 | B2 | 5/2004 | Landesmann |
| 6,873,967 | B1 | 3/2005 | Kalagnanam |
| 6,901,378 | B1 | 5/2005 | Linker |
| 7,016,864 | B1 | 3/2006 | Notz |
| 7,031,961 | B2 | 4/2006 | Pitkow |
| 7,080,070 | B1 | 7/2006 | Gavarini |
| 7,089,237 | B2 | 8/2006 | Turnbull |
| 2001/0011235 | A1 | 8/2001 | Kim |
| 2001/0014868 | A1 | 8/2001 | Herz |
| 2002/0046099 | A1 | 4/2002 | Frengut |

(Continued)

OTHER PUBLICATIONS

U.S. Appl. No. 11/291,507, filed Dec. 1, 2005, Continuous Usability Trial for a Website.

(Continued)

*Primary Examiner* — Sun Li
(74) *Attorney, Agent, or Firm* — Novak Druce Connolly Bove + Quigg LLP

(57) ABSTRACT

Requests for content are received, for example, an HTTP request for a web page is received. Each request has a landing context, which may include information about the user sending the request, the request itself, the referrer, or another subject. This information can be found in the requests or external to the requests. The information of the landing context is compared to appropriate triggering criteria. For requests that satisfy the appropriate triggering criteria, a destination is provided based on one or more weighted treatments. The request is directed to the provided destination. The results of the requests are subsequently analyzed and used to adjust the treatments in an automated fashion.

20 Claims, 10 Drawing Sheets

(56) References Cited

U.S. PATENT DOCUMENTS

| | | | |
|---|---|---|---|
| 2002/0082923 A1* | 6/2002 | Merriman et al. | 705/14 |
| 2002/0198882 A1 | 12/2002 | Linden | |
| 2003/0004781 A1 | 1/2003 | Mallon | |
| 2003/0074252 A1 | 4/2003 | Chandler-Pepelnjak | |
| 2003/0105682 A1 | 6/2003 | Dicker | |
| 2004/0044566 A1 | 3/2004 | Bostelmann | |
| 2004/0059708 A1 | 3/2004 | Dean et al. | |
| 2004/0190448 A1* | 9/2004 | Fishteyn et al. | 370/229 |
| 2005/0033641 A1* | 2/2005 | Jha et al. | 705/14 |
| 2005/0159921 A1* | 7/2005 | Louviere et al. | 702/181 |

OTHER PUBLICATIONS

U.S. Appl. No. 11/374,935, filed Mar. 14, 2006, System and Method for Website Experimentation.

U.S. Appl. No. 10/286,430, filed Oct. 30, 2002, Computer Process for Automatically Refining a List of Items Based on User Actions.

U.S. Appl. No. 10/393,505, filed Mar. 19, 2003, Adaptive Learning Methods for Selecting Web Page Components for Inclusion in Web Pages.

Mobasher, B., Cooley, R., and Srivastava, J., "Automatic Personalization Based on Web Usage Mining," Communications of the ACM, vol. 43, No. 8, dated Aug. 2000.

Yu, K., Xu, Xiaowei, Ester, M., and Kriegel, H., "Selecting Relevant Instances for Efficient and Accurate Collaborative Filtering," ACM Press, Proceedings of the Tenth International Conference on Information and Knowledge Management, Atlanta, Georgia, pp. 239-246 (2001).

Widyantoro, D., Ioerger, T., and Yen, J., "An Adaptive Algorithm for Learning Changes in User Interests," ACM Press, Proceedings of the Eighth International Conference on Information Knowledge Management, Kansas City, Missouri, pp. 405-412 (1999).

Schwab, Pohl, and Koychev, "Learning to Recommend from Positive Evidence," ACM Press, Proceedings of the 2000 International Conference on Intelligent User Interfaces, New Orleans, Louisiana, pp. 241-247 (2000).

Middleton, S., De Roure, D., and Shadbolt, N., "Capturing Knowledge of User Preferences: Ontologies in Recommender Systems," ACM Press, Proceedings of the International Conference on Knowledge Capture, Victoria, British Columbia, Canada, pp. 100-107 (2001).

Anderson, C., Domingos, P., and Weld, D., "Personalizing Web Sites for Mobile Users," AMC Press, The Tenth International World Wide Web Conference on World Wide Web, pp. 565-575 (2001).

VanderMeer, D., Dutta, K., Datta, A., Ramamritham, K., and Navanthe, S., "Enabling Scalable Online Personalization on the Web," ACM Press, Proceedings of the 2nd ACM Conference on Electronic Commerce, pp. 185-196 (2000).

Rossi, G., Schwabe, D., and Guimaraes, R., "Designing Personalized Web Applications," ACM Press, The Tenth International World Wide Web Conference on World Wide Web, pp. 275-284 (2001).

Langheinrich, M., Nakamura, A., Abe, N., Kamba, T., and Koseki, Y., "Unintrusive Customization Techniques for Web Advertising," pp. 1-19, printed on Feb. 1, 2002 from http://www8.org/w8papers/2b-customizing/unintrusive/unintrusive.html.

* cited by examiner

Fig. 4

```
Experiment {
  DLEX ID = XXXXX
  Partitions {
    partition_1 = {
      Landing Context Subspace {
        criteria name-value pairs
      }
      Weighted Treatment Allocation {
        { target, target name } => % allocation
        ...
      }
    }
    partition_2 = {
      Landing Context Subspace {
        criteria name-value pairs
      }
      Weighted Treatment Allocation {
        { target, target name } => % allocation
        ...

}
    }
        ... [additional partitions]
  }
}
```

Fig. 5

```
Experiment {
  DLEX ID = 9879
  Partitions {
    mens_shoes_partition = {
      Landing Context Subspace {
        click_path = /dp/B000123456
        }
      Weighted Treatment Allocation {
        { /b?node=1046211, "shoes sale" } => 50%
        { CONTROL, "control" } => 50%
      }
    }
  }
}
``` http://www.[searchengine].com/search?q=Ace+shoes http://www.[webretailer].com/Ace/dp/B012345/ref=sr_2/103?ie=UTF8&S=app&qid=12736 http://www.[webretailer].com/Ace/dp/B012345/ref=sr_2/103?ie=UTF8&S=app&qid=12736&DLEXID=191919

Fig. 11E

```
Experiment {
  DLEX ID = 191919
  Partitions {
    mens_shoes_partition = {
      Landing Context Subspace {
        click_path = /dp/B012345
        gender     = male
      }
      Weighted Treatment Allocation {
        { /b?node=104574, "men's shoes bn" } => 50%
        { CONTROL, "control" } => 50%
      }
    }
    womens_shoes_partition = {
      Landing Context Subspace {
        click_path = /dp/B012345
        gender     = female
      }
      Weighted Treatment Allocation {
        { /b?node=104576, "women's shoes bn" } => 50%
        { CONTROL, "control" } => 50%
      }
    }
  }
}
```

Fig. 11F http://www.[webretailer].com/b?node=104576/tag?ref=9786565

DYNAMIC CONTROL SYSTEM FOR MANAGING REDIRECTION OF REQUESTS FOR CONTENT

BACKGROUND

The World Wide Web has become an important medium for business and commerce. By creating online stores and other venues, merchants and other web site operators routinely offer their goods and services for sale over the Internet. One of the advantages of an online venue is the ease of which a customer can access and browse the merchandise or other offerings. However, the customer can also easily leave the website without making a purchase. To increase revenue, online venues seek to direct potential customers to portions of the content that will most likely lead to a purchase or other consumption by the visitor.

Online venues are discovered in many ways. For example, online venues may place advertisements on other websites to draw in users. To increase the effectiveness of an advertisement, or other referral, the link associated with the advertisement or referral can be selected to send the potential user to a page within the website that is more likely to generate revenue. However, the pages that are more likely to generate the revenue may change over time or vary among different people. Thus, there is a challenge to direct users to the appropriate portions of an online venue.

BRIEF DESCRIPTION OF THE DRAWINGS

The components in the drawings are not necessarily to scale relative to each other. Like reference numerals designate corresponding parts throughout the several views.

FIG. 4 depicts an example of an experiment.

FIG. 5 depicts an example of an experiment.

FIGS. 11A-11F provide an example of managing redirection of a request for content.

DETAILED DESCRIPTION

Figure 1:
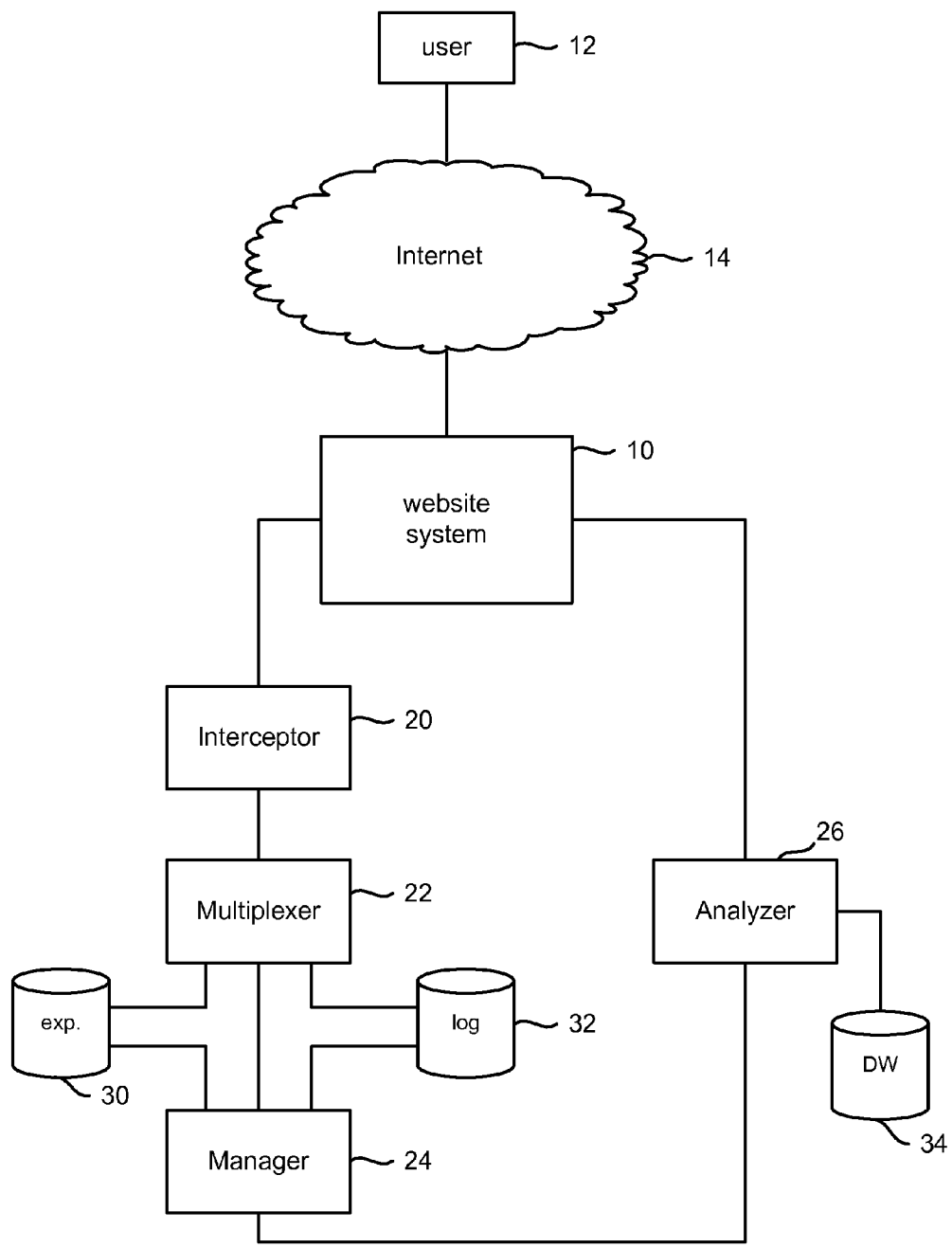
FIG. 1 is a block diagram of one embodiment of a system for implementing the technology described herein.

A technology is described herein for performing production-time experiments to determine the optimal landing page for an incoming request to a website or the appropriate next page during a visit to the website. By the term "production-time" it is meant that the experiments are performed while real users of a website are using the website. Experiments are designed to randomly distribute landing pages (or next pages) served to users who browse URLs registered in the experiments. Data tracking the behavior of customers who visit URLs registered in the experiments can be used to automatically update the experiments to better direct the user to the most appropriate landing (or next) page. In this manner, the experiment is both a process of testing as well as a closed loop control system that automatically and dynamically updates the target page that a user is directed to in response to selecting a link.

Triggering criteria are used to determine whether a request for content (incoming or internal) should be subjected to an experiment and, possibly, redirected. Requests that satisfy the triggering criteria are directed to any one of a set of programmable targets. Results of the redirected requests are monitored and used to update the experiments.

One embodiment includes receiving multiple requests for content, determining whether the requests include an identification, (for requests having the identification) accessing triggering criteria associated with the identification, (for requests having the identification) automatically determining whether user landing contexts of the requests satisfy the triggering criteria, automatically choosing one destination from two or more destinations corresponding to the triggering criteria for each request having user landing context that satisfies the triggering criteria (where the choosing is based on weights associated with the two or more destinations), automatically directing the request to the chosen destination, automatically analyzing results of those requests having user landing contexts that satisfy triggering criteria, and automatically adjusting the one or more weights based on the analyzing results.

One embodiment includes receiving requests for content and automatically determining whether the requests includes an identification. For requests that include the identification, automatically choose, at run time, content to deliver from two or more sets of content. The choosing is based on a set of rules. The set of rules are automatically adjusted based on results of at least a subset of the requests for content. This method can be performed by one or more processors programmed by processor readable code stored on one or more processor readable storage devices.

One embodiment includes receiving a request for content, automatically choosing at run time web pages to deliver in response to the requests for content (where the choosing is based on a set of rules), and automatically adjusting the set of rules based on results of at least some of the requests for content.

One embodiment includes automatically choosing at run time whether and where to redirect a set of requests for content based on a set of rules, automatically redirecting at least a subset of the requests based on the step of choosing, and automatically adjusting the set of rules based on results of at least some of the requests for content.

One embodiment includes one or more storage devices that store triggering criteria and one or more treatments that indicate content to provide in response to an incoming request for content if at least a subset of the triggering criteria is satisfied by the incoming request. The system also includes one or more processors in communication with a communication interface and the one or more storage devices. The one or more processors receive multiple requests for content from the communication interface and automatically apply the triggering criteria and one or more treatments to a subset of the multiple requests that include an identifier associated with the triggering criteria. The one or more processors automatically analyze results for the subset of multiple requests and automatically adjust the one or more treatments based on the analyzed results.

FIG. 1 is a block diagram depicting one embodiment of a system that can be used to implement the technology described herein. FIG. 1 depicts website system 10, which can include one or more servers that implement a website. In one example, the website implemented is a retail website; however, many other types of websites (or other providers of content on a network) can also be implemented. Website system 10 is depicted as a block because no one particular architecture is required for the technology described herein. Many different architectures can be used. User 12 can access website system 10 via Internet 14 or any other type of network, including wired and wireless networks. In one embodiment, user 12 comprises a human operating a computing device that includes a browser or other client software for communicating with the website server of system 10. In other embodiments, user 12 can be a server, a computer program or other entity that does not include a human. Examples of appropriate hardware for user 12 include a desktop computer, notebook computer, handheld computing device, mobile computing device, cellular telephone, or any other computing device. Although a browser is likely to be used to connect to website system 10, other software or applications can also be used.

When user 12 attempts to access a page (or other resource) within website system 10, the technology described herein dynamically chooses whether and where to redirect a request for that webpage by the user. The user's request for the webpage could be the initial transit to the website in a particular visit or it could be for a subsequent page once user is already viewing part of the website of website system 10. That system for dynamically and optionally choosing whether and where to redirect a request, in one embodiment, includes Interceptor 20, Multiplexer 22, Manager 24 and Analyzer 26. Each of these components can be embodied within one or more servers, and will be discussed in more detail.

Interceptor 20 is in communication with website system 10. In one embodiment, Interceptor 20 can be implemented using one or more physical computers that may or may not be load balanced. In one alternative implementation, Interceptor 20 is inside website system 10. In other embodiments, Interceptor 20 is in communication with website system 10. Interceptor 20 monitors traffic into and within website system 10 looking for requests for web pages that include an Experiment ID. When traffic is found that includes an Experiment ID, Interceptor 20 will contact Multiplexer 22 to determine whether and how to redirect the request.

Multiplexer 22 is in communication with Interceptor 20. Multiplexer 22 is implemented with one or more physical computers which may or may not be load balanced. Multiplexer 22 receives requests from Interceptor 20 that include an Experiment ID. Multiplexer 22 will find the appropriate experiment associated with the Experiment ID and determine whether the landing context for the incoming requests satisfies the triggering criteria of the experiment. If so, Multiplexer 22 will choose an appropriate treatment and forward the request based on that treatment.

Manager 24 is in communication with Multiplexer 22. Manager 24 is implemented using one or more physical computing devices that may or may not be load balanced. Clients of the system will interact with Manager 24 to create, read, update and delete experiment details. Manager 24 will also provide reports on treatment allocation. Operations to create an experiment will return the newly created Experiment ID which must then be used in a query string of a URL which the clients wish to be modified by the system of FIG. 1. Operations to modify, delete or examine experiments must also provide this Experiment ID.

FIG. 1 also shows experiment data store 30 and log data store 32, both of which are in communication with Multiplexer 22 and Manager 24. Each time Multiplexer 22 operates on an incoming request, an entry is made in log data store 32. Manager 24 will store all of the experiments in experiment data store 30. During operations the system, Multiplexer 22 will read information about the experiments from experiment data store 30.

The system of FIG. 1 also includes Analyzer 26, which is in communication with Manager 24 and website system 10. Analyzer 26 is implemented using one or more physical computers that may or may not be load balanced. Analyzer 26 can access the information in log data store 32 via Manager 24. In one embodiment, Analyzer 26 can observe and analyze all requests and operations on website system 10. In other embodiments, other components of web system 10 will observe all interactions with web system 10 and report those actions to Analyzer 26. Based on observing the interactions of users with website system 10, Analyzer 26 can determine whether a visit by a user was successful. In some embodiment, Analyzer 26 can determine a degree of success. For example, a purchase of a high margin luxury item may be considered more of a success that a purchase of an item marketed as a loss leader. The information about whether a visit was a success and how much of a success can be stored in data warehouse 34. Using the information in data warehouse 34 and log data store 32, Analyzer 26 can determine which treatments were more successful. Using Manager 24, Analyzer 26 can edit the experiments based on determining which treatments were more successful.

Figure 2:
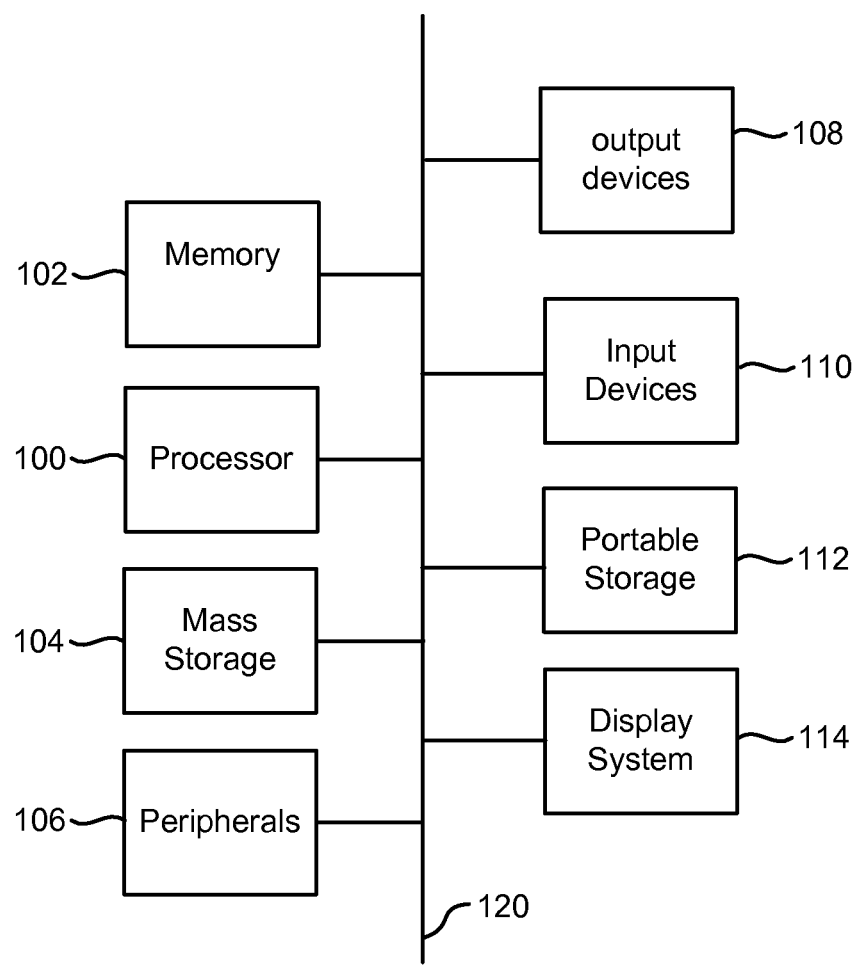
FIG. 2 is a block diagram of an embodiment of a computing system that can be used to implement the technology described herein.

FIG. 2 is a high level block diagram of the computing system which can be used to implement any of the components 10, 12, 20, 22, 24 and/or 26 of FIG. 1. The computing system of FIG. 2 includes processor 100, memory 102, mass storage device 104, peripherals 106, output devices 108, input devices 110, portable storage 112, and display system 114. For purposes of simplicity, the components shown in FIG. 2 are depicted as being connected via single bus 120. However, the components may be connected through one or more data transport means. In one alternative, processor 100 and memory 102 may be connected via a local microprocessor bus, and the mass storage device 104, peripheral device 106, portable storage 112 and display system 114 may be connected via one or more input/output buses.

Processor 100 may contain a single microprocessor, or may contain a plurality of microprocessors for configuring the computer system as a multiprocessor system. Memory 102 stores instructions and data for execution by processor 100. If the technology described herein is wholly or partially implemented in software, memory 102 will store the executable code when in operation. In one embodiment, memory 102 may include banks of dynamic random access memory, high speed cache memory, flash memory, nonvolatile memory, or other storage elements. For example, memory 102 can store code to program processor 100 and can store the data representing an experiment. Processor 100 can perform the methods described herein based on the stored code and using the experiment data.

Mass storage device 104, which may be implemented with a magnetic disc drive or optical disc drive, is a nonvolatile storage device for storing data and instructions for use by processor 100. In one embodiment, mass storage device 104 stores the system software that implements the technology described herein for purposes of loading to main memory 102. Mass storage device 104 can also store the experiment data.

Portable storage device 112 operates in conjunction with a portable nonvolatile storage medium, such as a floppy disc, CD-RW, flash memory card/drive, etc., to input and output data and code to and from the computer system of FIG. 2. In one embodiment, experiment data and system software for implementing the present invention is stored on such a portable medium, and is input to the computer system via portable storage medium drive 112.

Peripheral devices 106 may include any type of computer support device, such as an input/output interface, to add additional functionality to the computer system. For example, peripheral devices 106 may include a network interface for connecting the computer system to a network, a modem, a router, a wireless communication device, etc. Input devices 110 provides a portion of a user interface, and may include a keyboard, or pointing device (e.g. mouse, track ball, etc.). In order to display textual and graphical information, the computer system of FIG. 2 will (optionally) have an output display system 114, which may include a video card and monitor. Output devices 108 can include speakers, printers, network interfaces, etc.

The components depicted in the computer system of FIG. 2 are those typically found in computing systems suitable for use with the technology described herein, and are intended to represent a broad category of such computer components that are well known in the art. The computing system of FIG. 2 can be a personal desktop computer, workstation, server, minicomputer, main frame, laptop computer, handheld computer, mobile computer, cellular telephone, television set-top box, or other computing device. Many different bus configurations, network platforms, operating systems can be used. The technology described herein is not limited to any particular computing system.

Figure 3:
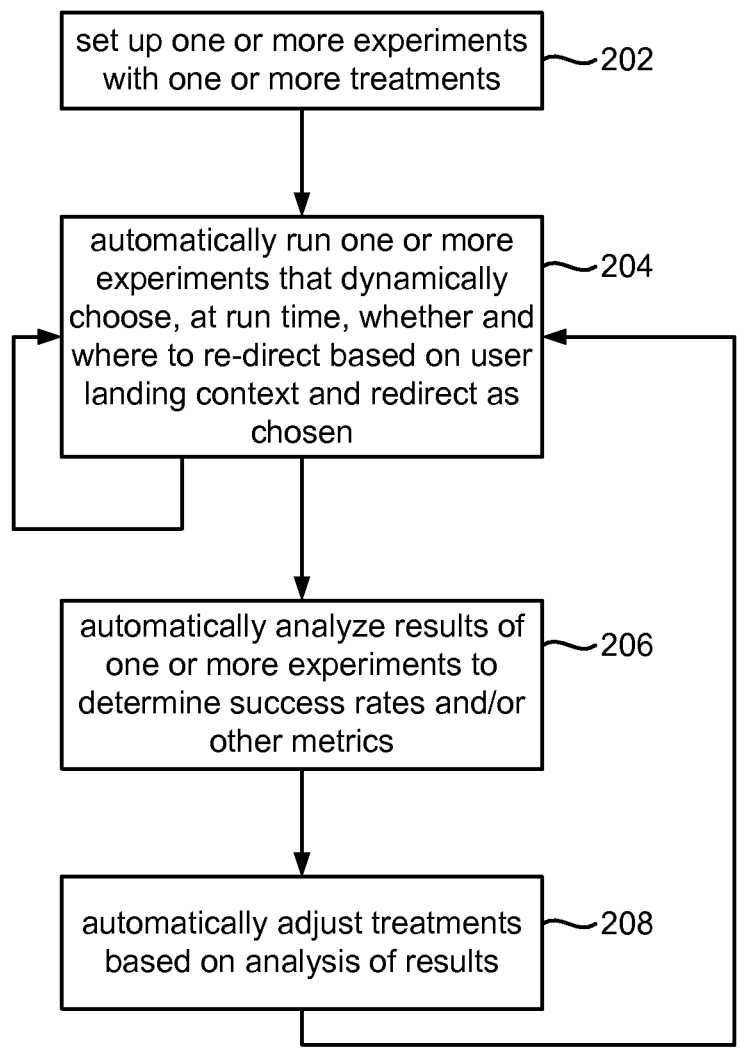
FIG. 3 is a flow chart describing one embodiment of a process for managing redirection of requests for content.

FIG. 3 is a high level flow chart describes the operation of how the system of FIG. 1 (or another system) manages the redirections of requests for content as part of one or more experiments. In step 202 of FIG. 3, one or more experiments are set up, with each of the experiments including one or more treatments. The experiments can be created manually by a human or automatically using a computer. For example, in one embodiment, a software application can monitor user searches on a retail website or search portal and correlate the search terms used by various users to what items the users actually purchased and what pages the user looks at before making those purchases. Based on that information, a set of triggering criteria and a set of alternative treatments (e.g., destination web pages) can be determined automatically and used to create an experiment automatically. On the other hand, a human can create an experiment by manually choosing how and when to redirect a request for content. Step 202 is performed using Manager 24.

In step 204 of FIG. 3, one or more experiments are automatically run. This includes dynamically choosing, at run time, whether and where to redirect requests for content based on user landing context. As explained herein, these experiments include automatically directing the requests for content to a target webpage. Experiments include one or more treatments, some of which may include directing the requests to its original destination. Step 204 is performed by Interceptor 20 and Multiplexer 22. In step 206, Analyzer 26 will analyze the results of one or more of the experiments to determine success rates and/or other metrics. The technology described herein is not limited to any particular metric. In step 208, zero, one or more treatments from one or more of the experiments will be adjusted based on the analysis of step 206. In one embodiment, Analyzer 26 will cause Manager 24 to adjust one or more treatments. The adjusted treatments will then be stored in experiment data store 30. After updating the experiments in step 208, the process will loop back to step 204 and continue to automatically run one or more experiments.

Note that FIG. 3 also shows an arrow from 204 to itself, indicating that step 204 can be performed continuously. Step 206 and 208 can be performed concurrently with the continuous performance of step 204. More details of steps 204, 206, and 208 will be provided below.

Step 202 of FIG. 3 includes setting up one or more experiments. FIG. 4 depicts a template that represents the structure of an experiment. The template includes an Experiment ID; for example, FIG. 3 shows a line of code "DLEX ID=XXXX." Other formats can also be used. An experiment can have one or more partitions. The template of FIG. 4 shows two partitions (partion_1 and partition_2); however, more than two or less than two partitions can also be used. Each partition has triggering criteria that represents a subspace of the potential landing context. The landing context is the set of variables which uniquely define the user's current attempt to land on a webpage. The landing context can include variables identifying the referrer such as the referrer host, extracted search terms from a search on the referrer system, and search page information. For example, if the user is accessing the webpage in response to clicking on a link in a search results page, the landing context could include the name of the search provider, the search terms and which page of results that user is coming from. The landing context could also include information about the user such as age, name, gender, marital status, country of origin, other demographics, preferences, etc. The landing context can also include information about the request such as the origin IP address, session ID, browser type, browser version, language, platform, etc. The landing context could also include information about environmental factors such as current time of day, weather, etc.

The subspace of the landing context associated with a partition is described by a set of criteria (the triggering criteria). The criteria can include one or more name-value pairs. According to some embodiments, the landing context subspace for a partition may not overlap with another partition of the same experiment. In other embodiments, partitions can overlap and the system can prioritize which one is selected based on order or other criteria.

Each partition also includes one or more weighted treatments. Each treatment will include a target, a target name and a % allocation, where the % allocation represents a weight. According to embodiments, the sum of all of the percentage allocations for all the treatments for a given partition equals 100%. For example, if there is only one treatment, then the percentage allocation for that treatment is 100%. For each treatment, the target represents the target URL, or a portion of the target URL, that the request will be redirected to. This target could be the original target from the request or a different target that the request will be directed to. The target name can be a user-friendly name associated with the target that can, for example, be used for identification purposes.

FIG. 5 provides example code according to the template of FIG. 4. In the example, the Experiment ID is equal to 9879 and there is only one partition. The triggering criteria for that one partition includes whether the click path, or a portion of the click path, is equal to "/dp/B000123456." The click URL is the URL originally clicked on by the user and the click path is the path portion of the Click URL. According to the example, the triggering criteria is satisfied if the click path includes the string "/dp/B000123456.". In the example of FIG. 5, that string identifies a particular display page in a retail website. However, other strings can be used to identify a portion of the click path. If the triggering criteria is not met, none of the treatments will be performed. If the triggering criteria is met, then the treatments of that particular partition will be performed. In this example, the partition includes two treatments. The first treatment has a target equal to "/b?node=1046211." This is a identification of a webpage that will be added to the host name in the request's URL. This webpage, in this example, can refer to a browse node of a particular category, which could display several products, rather than a specific item detail page for a single item. In this example, the particular target is referred to as "shoe sale." The second treatment has a target of "control." The term "control" is used as a shortcut to indicate that the target is the same as the incoming click path. Both treatments, according to this example, are given weights of 50%. That is if the incoming click path is equal to the "/dp/b00123456", then 50% of the time the user will be directed to that same click path and 50% of the time the user will be directed to "/b?node=1046211." In some embodiments, the original request is not included as one of the treatments. Rather, for example, the second treatment in the given example may be another URL.

In one embodiment, the treatment will be chosen by randomly choosing one of the two treatments according to the weights. For instance, a random number can be chosen between zero and one.

In another embodiment, the system can choose treatments by performing a hash on an identifier, such as a session ID associated with this particular visit by the user. The system can be set up to hash all session IDs into a set of groups based on the different weightings so that over time the various weightings will accomplish the allocations based on those weightings. In this embodiment, if a user is subjected to the same experiment more than once and has the same relevant landing content each time, then the user will receive the same treatment each time. This can be a less confusing approach in that the user is not directed to different destinations from the same link during the same session. However, in some embodiments it may be useful to provide different landing pages to the same user to determine their respective success rates.

The example of FIG. 5 shows that any incoming request for content with a URL that contains the Experiment's ID of 9879 and whose landing context falls within the defined subspace (that is, a click path equal to /dp/B00123456) will be redirected based on one of the treatments, with a 50% chance of being redirected based on the first treatment and a 50% chance of being redirected based on the second treatment. The first treatment sends the user to a different node than requested and the second treatment sends the user to the same page that they requested. The receiving of the request, evaluating the triggering criteria, and performing the treatments are all performed as part of step 204 of FIG. 3. Over time the system will determine how successful the various treatments were by looking at the success rates for each of the visits in step 206. In step 208, the treatments (or other parts of) can be altered based on the results of the analysis. In one embodiment, the various weightings can be changed to favor the treatment that has a higher success rate. In other embodiments, the target of the treatments can also be changed if a treatment is underperforming or for another reason.

FIGS. 4 and 5 depict exemplary code, pseudo-code and/or configuration data that can be used by executable code. It is possible to design the experiment using the depicted code and provide that code to Manager 24. For example, that code could be in a configuration file that Manager 24 uses to create the actual data structure(s) for the experiments. In another embodiment, the experiment can be designed using Java objects, other types of objects, or an API. When using Java objects, there could be an object for each experiment or an object for each partition. Within each object will be a set of fields storing information for the particular partitions. There is no one particular way for creating and storing an experiment.

Figure 6:
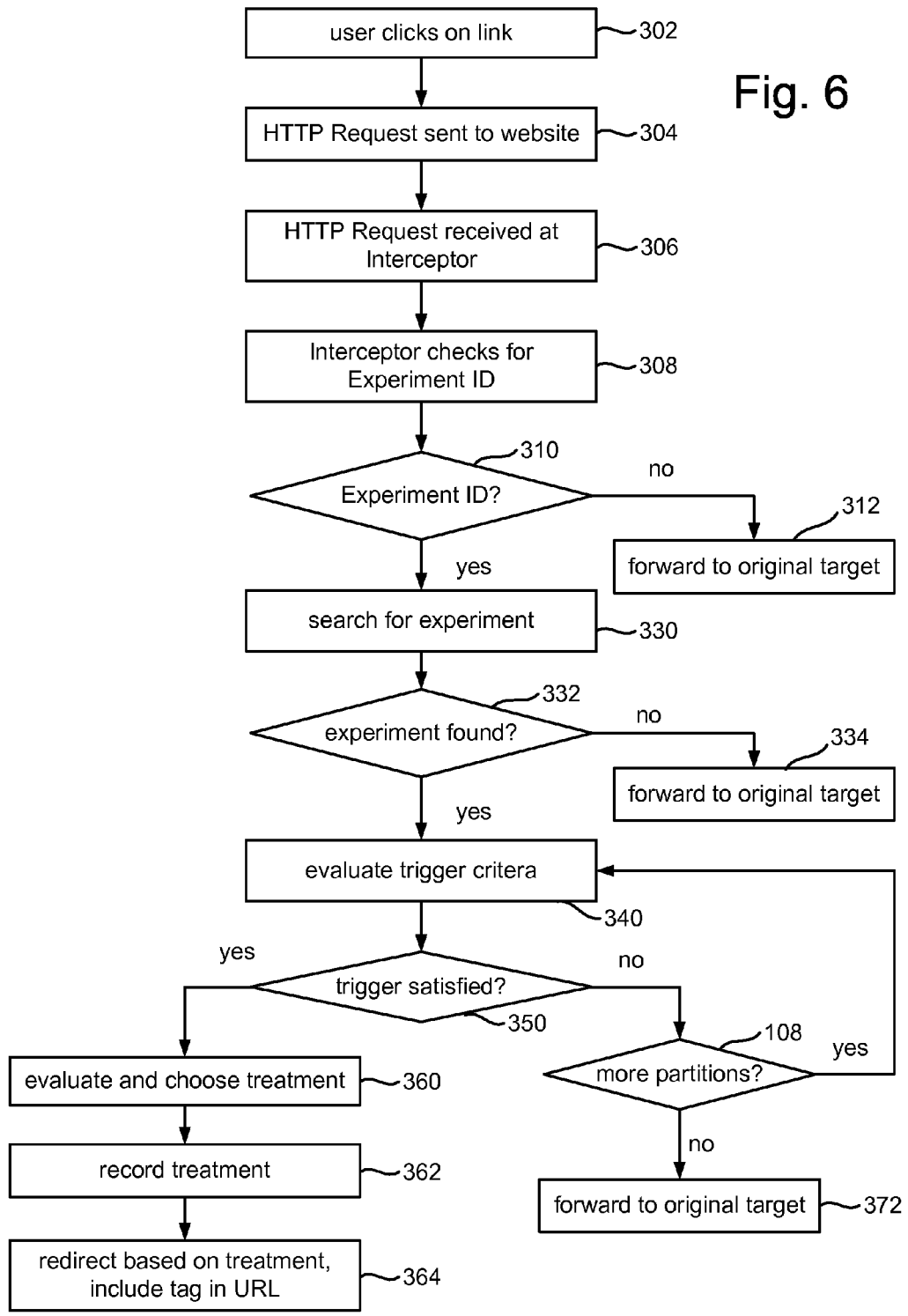
FIG. 6 is a flow chart describing one embodiment of a process for implementing an experiment.

FIG. 6 is a flow chart describing more details of the process of automatically running one or more experiments that dynamically choose, at runtime, whether and where to redirect requests for content based on the user landing context (step 204 of FIG. 3). The process of FIG. 6 can be performed in response to a user transit into the website of system 10 or a user browsing within pages of the website of system 10.

In step 302 of FIG. 6, the user clicks on a link in, for example, an HTML based document or webpage. In response to that link, the user's browser (or other application) creates and sends a request for content based on the URL associated with the link. One example of a request is an HTTP request. The HTTP request is sent to the website, in this case website system 10, in step 304. In step 306 the HTTP request is received at Interceptor 20. In step 308, Interceptor 20 determines whether there is an Experiment ID in the request. The Experiment ID can be in the URL, in a header, or elsewhere. If there is no Experiment ID in the request (step 310), then the request is forwarded to the original target in step 312. If there is an Experiment ID in the request (step 310), then Interceptor 20 provides that Experiment ID to Multiplexer 22, which searches for the experiment associated with that Experiment ID in step 330. For example, Multiplexer 22 searches experiment data store 30. If an experiment is not found (step 332), then Multiplexer 22 informs Interceptor 20 that there is no experiment and Interceptor 20 will forward the request to the original target of the request.

If an experiment is found (step 332) that matches the Experiment ID of the request, then the triggering criteria for the experiment is evaluated by Multiplexer 22 in step 340. If the triggering criteria is satisfied (step 350), then the treatments are evaluated by Multiplexer 22 and a treatment is chosen in step 360. In step 362, the chosen treatment is recorded in the log 32 by Multiplexer 22. In step 364 the user is directed to a target based on the treatment. Step 364 includes Interceptor 20 creating a new URL from the original URL by substituting the old target with the new target and adding a tag to the URL. The tag could be an indication of the iteration of the experiment that is unique to this particular request. This tag will also be stored in log 32 (associated with the recordation of the chosen treatment) for future analysis. By using a tag in the URL, Analyzer 26 can analyze the results of visit and correlate it back with the information in the log. In another embodiment, the session ID can be used to track a visit.

If, in step 350, it is determined that the trigger criteria was not satisfied, than in step 370 Multiplexer 22 determines whether there are more partitions in this particular experiment to consider. If there are no more partitions to consider, than the user is forwarded to the original target of the request in step 372. If there are more partitions that need to be considered, the process loops back to step 340, chooses the next partition, and evaluates the triggering criteria for the next partition. The loop will continue until either all the partitions have been considered or the triggering criteria for one partition is met. The process of FIG. 6 is performed every time a request for content is received at Interceptor 20. Thus, the process of FIG. 6 can be performed many times as part of step 204 of FIG. 3.

Step 372 directs a user to an original request and step 364 redirects the user. In other embodiments, the system can perform other actions instead of directing and redirecting. For example, the actual chosen web page can be dynamically generated, the actual chosen web page can be retrieved and returned in response to the request, multiplexer 22 can output an indication of the chosen web page for another entity to act on, other types and forms of content can be provided, or other actions can be taken.

Figure 7:
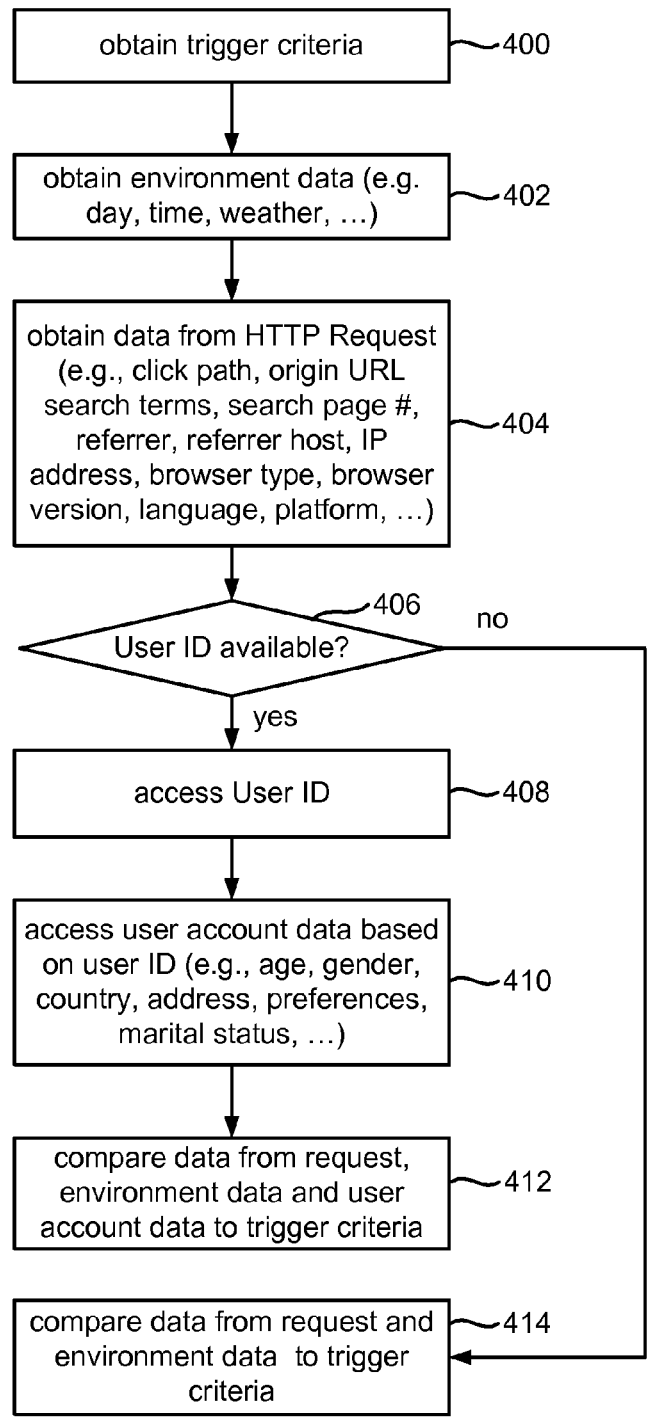
FIG. 7 is a flow chart describing one embodiment of a process for evaluating trigger criteria.

FIG. 7 is a flow chart describing more details of the step of evaluating trigger criteria (step 340 of FIG. 6). In step 400 of FIG. 7, Multiplexer 22 obtains the appropriate triggering criteria for the partition under consideration from experiment data store 30. In step 402, Multiplexer 22 obtains any necessary environment data relevant to the triggering criteria. For example, if the triggering criteria indicates day, time or weather, that information will be obtained by Multiplexer 22 from the system clock, a weather website, time and date website, etc. In step 404, Multiplexer 22 obtains data from the HTTP request, including such items as search term, search page number, referrer, referrer host, IP address, browser type, browser version, language, platform, etc. In step 406, it is determined whether a user ID or other identification is available. If not, the process continues to step 414 where the obtained data from the request and environment data (if needed) are compared to the trigger criteria.

If the user ID or other identification was found to be associated with the HTTP request, then that user ID is accessed in step 408. In some embodiments, a user may have a cookie (e.g. HTTP cookie) stored on the user's computer. That cookie could include a user ID or other identification, among other types of information about the user. When an HTTP request is sent to the website associated with system 10, the contents of the cookie will be included as header information in the HTTP request. Multiplexer 22 will access that user ID in step 408 and use that user ID to access the relevant user account in a user account database for system 10. Multiplexer 22 can use an API to access that user account database based on the user ID found in the cookie. In response, Multiplexer 22 will be provided with the information associated with the user account and can compare that information to the triggering criteria in step 412. The user account database can include accounts for each user known to the system. Each account may include personal information such as name, geographical information (e.g. based on billing and shipping addresses), prior shopping and purchase activity, country, gender, preferences, marital status, history, demographic information and other information. In step 412, the appropriate environment data, data from the request, and user account data are compared to the trigger criteria. Together the environment data, data from the request, and user account data make up the user landing context discussed above. This user landing context is compared to the triggering criteria which represents the subset of all potential user landing context.

Figure 8:
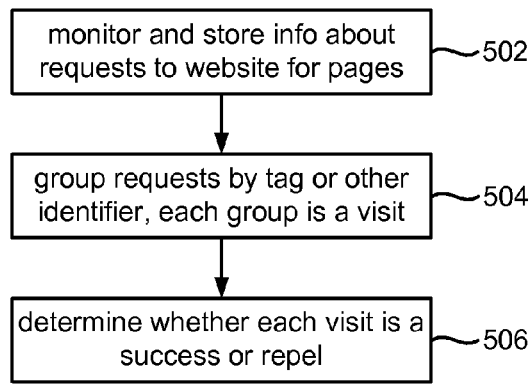
FIG. 8 is a flow chart describing one embodiment of a process for automatically analyzing results.

FIG. 8 is a flowchart describing more details of an embodiment of the step of automatically analyzing results of one or more experiments to determine success rates and/or other metrics (step 206 of FIG. 3). In step 502, Analyzer 26 monitors and stores the information about requests to the website of system 10. This information could include how many pages of the website the user viewed, an identification of the web pages the user viewed, whether the user made a purchase or performed some other consumption activity (e.g. rental, digital download, etc.), whether the user provided personal information, whether the user added an item to a shopping cart, whether the user opened up an account, how long the user maintained a presence on the website, whether the user clicked on a paid advertisement, among many other possibilities. It should be apparent that there may be various measurements of success rates which can vary greatly depending on the goals and objectives of the entity interested in measuring the success rates. In step 504, Analyzer 26 will group the various requests that the user submitted along with the stored information about those requests. The request will be grouped by a tag; for example, the tag added in step 364 of FIG. 6. Alternatively, a session ID can be used to group the various requests. Tagging can also be used in combination with a session ID. In other embodiments, other means can be used to group requests so that all requests of a particular visit are grouped together. In another embodiment, a server or set of servers inside website system 10 (other than Analyzer 26) can be used to perform steps 502 and 504. In step 506, Analyzer 26 will determine whether each visit is a success or repel.

In one embodiment, a visit is defined as a group of requests that were aggregated together in step 504. A set of rules is applied to each group to determine whether it is considered a success or repel. In one example, a visit is considered a success if a user visited three or more pages, a user purchased an item, or a user opened an account. Otherwise, the visit is considered a repel.

Figure 9:
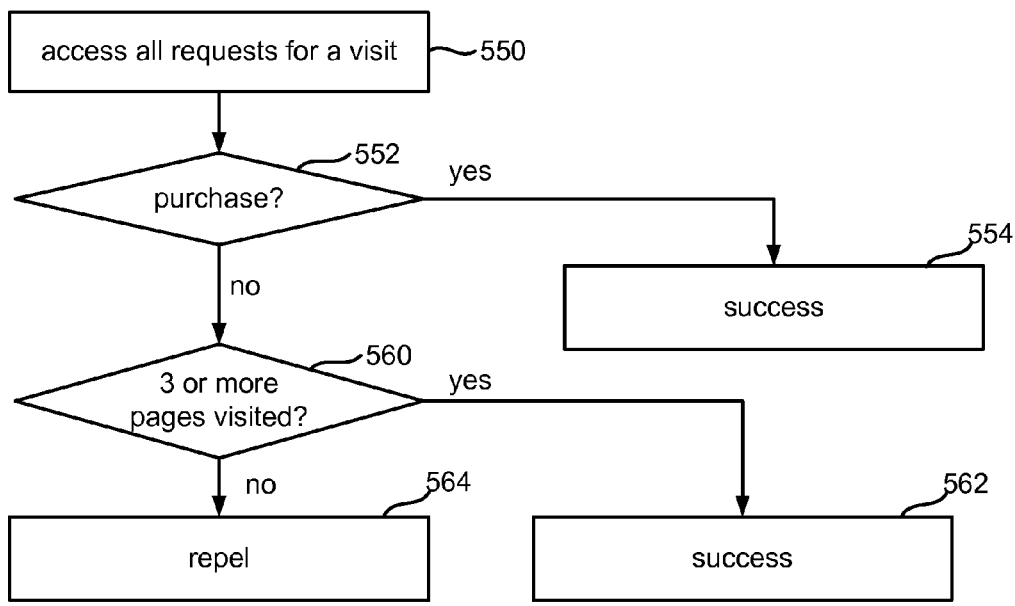
FIG. 9 is a flow chart describing one embodiment of a process for determining whether a visit was successful.

FIG. 9 is a flow chart describing more details of one embodiment of the step determining whether a visit is a success or repel (step 506 of FIG. 8). In step 550, Analyzer 26 accesses all requests for a particular visit. In step 552, Analyzer 26 determines whether there was a purchase made. If there was a purchase then the visit is considered a success (step 544). If there was no purchase (step 552), but the user visited three or more pages in the website (step 560) then the visit was a success (step 562). If the user did not visit at least three pages, then the visit is considered a repel (step 564). The technology described herein is not limited to any one particular measure of success or repel; therefore, other measures or tests for whether a visit is a success can also be used. The process of FIG. 9 will be performed for each visit. Therefore, the processing in FIG. 9 will be performed multiple times when performing step 506 of FIG. 8.

Although FIGS. 8 and 9 describe one embodiment for analyzing the results, other methods can also be used. U.S. patent application Ser. No. 10/393,505, filed on Mar. 19, 2003, titled "Adaptive Learning Methods For Selecting Web Page Components For Inclusion in Web Pages," incorporated herein by reference in its entirety, discloses a system for analyzing results including methods for determining component scores, monitoring exposure, monitoring activity, and score determination, which can be use with the present technology to analyze result of the one or more experiments. Other systems for analyzing results can also be used.

Figure 10:
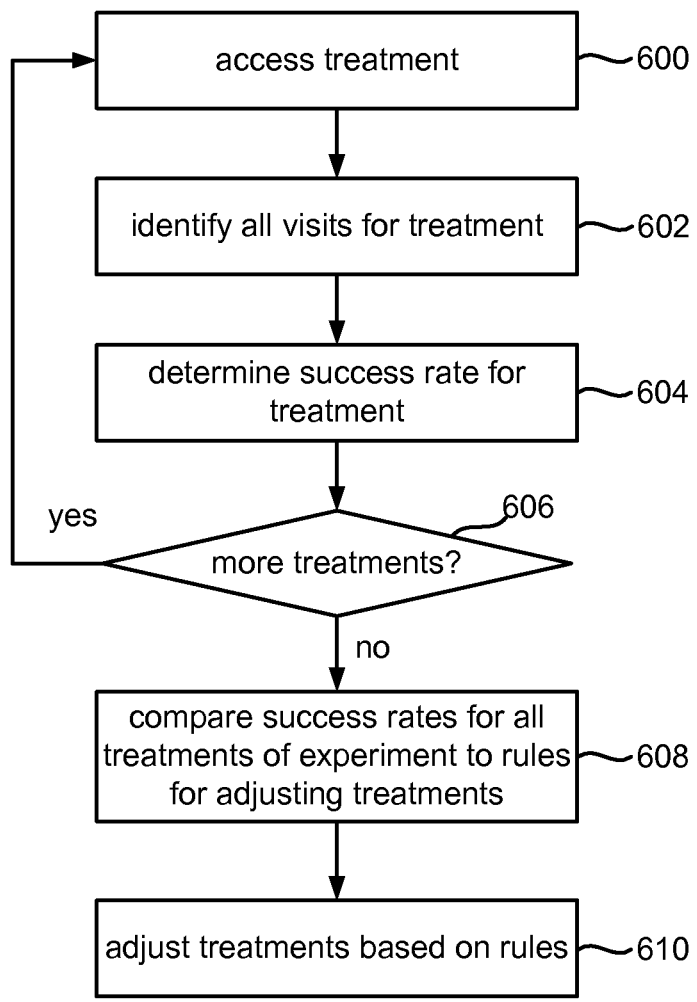
FIG. 10 is a flow chart describing one embodiment of a process for automatically adjusting treatments.

FIG. 10 is a flowchart describing more details of an embodiment of the step of automatically adjusting treatments based on the analysis of results (step 208 of FIG. 3). The processes of FIG. 10 will be performed for each experiment (or, in some embodiments, a subset of experiments). In step 600, a treatment of the experiment currently being considered is accessed. For example, Analyzer 26 will access an entire experiment from Manager 24 and access the first treatment. In step 602, Analyzer 26 will identify all visits for that treatment. That is, based on log data store 32 and the analysis of the results (step 206 of FIG. 3), Analyzer can determine all visits that were performed as a result of the particular treatment. In step 604, Analyzer 26 will determine the success rate for the treatment based on the success (or other metric) for the visits identified in step 602. For example, if there were two thousand visits for that treatment and fifteen hundred of those visits ended up as a repel, then the success rate is 25%. In step 606, it is determined whether there are more treatments in the experiment to be considered. If so, the process loops back to step 600 and performs steps 600-604 for the next treatment.

If there are no more treatments in the experiment that need to be considered (step 606), then in step 608 the success rates for all the treatments are compared against each other and compared against a set of rules that are used to adjust treatments. In step 610, the treatments are adjusted based on the rules. In one embodiment the adjustment includes changing the weightings for each treatment. In another embodiment, the treatment target can also be changed. For example, in some embodiments, a relatively unsuccessful treatment can be dropped altogether in favor of new treatments, while keeping the most successful treatments.

One example set of rules could require that the weightings be equal to the comparative success rates. So if one treatment is twice as successful as the other treatment then the one treatment will have a weighting twice as large. For example, if treatment A has a 50% success rate and treatment B has a 25% success rate, then the weightings may be changed to 66% for treatment A and 33% for treatment B. Other rules can also be used. The technology described herein is not limited to any particular set of rules.

Figures 11A, 11B, 11C, 11D:
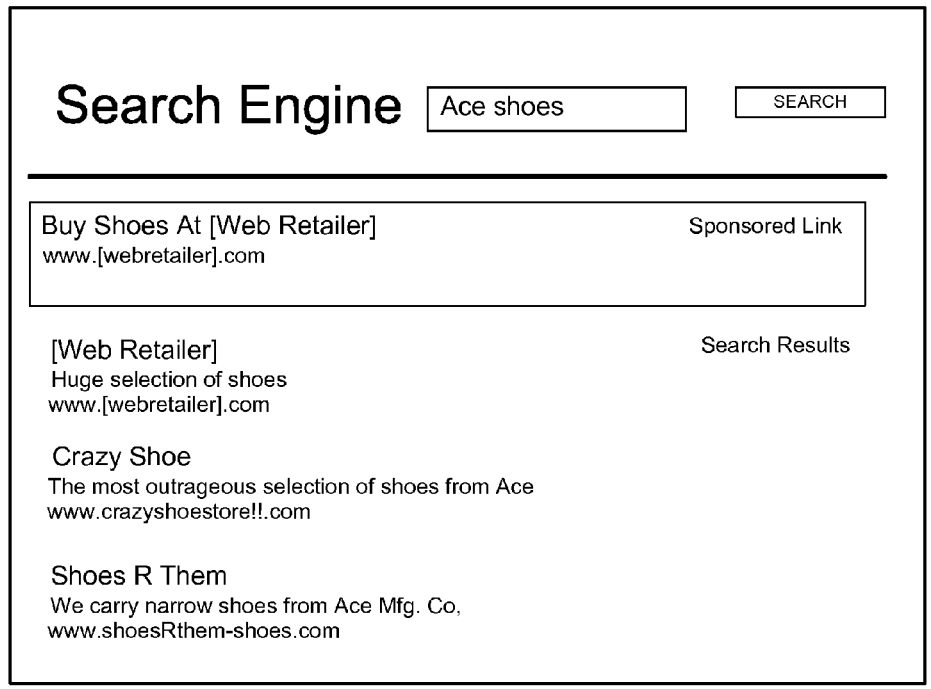

FIGS. 11A-F provide an example that help explain some of the concepts described above. This example assumes that a user performs a search on a search engine for shoes by a company named Ace. As shown in FIG. 11A, the search terms entered by the user are "Ace shoes," and the corresponding results of the search are displayed in the search results listing also depicted in FIG. 11A. In some embodiments the search engine could be a search engine website that has no affiliation with the information indexed therein. However, in some embodiments the search engine is part of an integrated search feature of a particular venue, such as a retail website, social networking website, or news aggregator. In this example the search engine may index items (e.g. products, user profiles, and/or news articles) associated with the website.

The results listing includes a Sponsored Link and three search results. It is known in the art that many search engines will sell Sponsored Links, which include selling key words so that when those key words match the user's search term, the associated Sponsored Link will show up in the search engine results. In this case the Sponsored Link is an advertisement from [Web Retailer] and tries to entice the user to buy shoes at [Web Retailer]. The first result in the search results is also for that same [Web Retailer] and includes a link to that web retailer's site. The second search result is for a store named Crazy Shoe. The third result is for a store named Shoes R Them.

In some embodiments where a Sponsored Link is sold, the owner of the Sponsored Link (the advertiser) may have provided the link to the search engine many months in advance. The website that is the target of the Sponsored Link may have changed in the interim due to updates in technology, new merchandise, sales, etc. Thus, the owner of the Sponsored Link may want to have the ability to modify or dynamically change where the consumer who selects the Sponsored Link is directed to in the website. Further, the owner of the Sponsored Link may have determined that the original target destination was not resulting in conversions and wants to run experiments to determine whether users who are provided with different destinations react differently to different pages. The technology described herein can be used to provide such flexibility.

When the user clicks on the link of the Sponsored Link (www.[webretailer].com) the process of FIG. 6 will be performed. FIG. 11B depicts the URL associated with the search engine page of FIG. 11A. This URL is the origin URL that is part of the request data (step 404 of FIG. 7). The URL can be passed as the referral link upon a selection of a link to a destination webpage. Notably, the URL can be parsed to determine the referring website and the search terms used, among other possible information that could be located within this URL (e.g. search result page number, etc.) and potentially used as a triggering condition. FIG. 11C shows the click path that is used in the HTTP request to the web retailer in response to the user selecting the Sponsored Link. This URL is in the request sent in step 304 of FIG. 6. Everything after the host identification (www.[webretailer].com) is part of the click path. FIG. 11D is the same URL as FIG. 11C but further includes an Experiment ID (DLEXID=191919) appended to the URL. If the owner of the web retailer wanted to have the flexibility to change the landing page where a user landed in response to clicking on the sponsor link, that web retailer would include, for example, DLEXID=191919 in the URL to invoke the automatic and dynamic redirecting of requests by interceptor 20.

FIG. 11E shows code representing an experiment with an Experiment ID of 191919. The experiment has two partitions. The first partition has triggering criteria for two variables. The first variable is a click path and the second variable is gender. The click path is part of the data from the request and the gender can be obtained from the user account. The triggering criteria of the first partition is satisfied if the click path is equal to /dp/B012345 and the user account indicates that the user is male. If the triggering criteria is satisfied for the first partition, then there are two treatments. The first treatment replaces the click path with a new click path of /b?node=104574, associated with a page that could, for example, display a variety of pairs of Ace brand men's brown shoes that are available for sale. The second treatment is the control treatment which allows the user to continue to the target of the original click path (i.e. /dp/B012345) which could, for example, be an item detail page that is specific to a pair of Ace shoes. Each treatment is weighted at 50%. Similar to the first partition, the second partition (women's_shoe_partition) includes two variables in its triggering criteria. The first variable is the click path of/dp/B012345. The second variable is that the user account indicates the gender is female. There are two associated treatments for the women's_shoes_partition. In the first treatment, the click path is replaced with /b?node=104576 which could, for example, correspond to a page that displays a variety of pairs of women's brown shoes. The second treatment is the control treatment which could, for example, be the item detail page that is specific to a single pair of Ace shoes. Both treatments are weighted at 50%. In some embodiments there may be more or less treatments in each partition and it is not necessary that each partition within an experiment have an identical number of treatments. Further, if no triggering criteria is matched for a particular experiment id the control path can be used or some other default treatment can be selected.

Thus, according to the example of FIG. 11E, if the user issues the search for Ace shoes and clicks on the Sponsored Link of FIG. 11A, then the user's request will be subjected to the experiment 191919. If the user's account indicates the user is male, they have a 50% chance of being redirected to the men's brown shoes page. If the user's account indicates that they are female, they have a 50% chance at being redirected to the women's brown shoe page. If the user account does not indicate gender, there is no user account, or there is no user ID in the request, then the triggering criteria will not be satisfied and the user will be directed to the original target. In the example where the user is female and the treatment assigned is the first treatment, sending the user to the women's shoes page for brown shoes, then the redirected URL will be in the form depicted in FIG. 11F.

Some embodiments of the present disclosure have been described in terms of redirection from a website other than the website of the target website. However, the redirection could occur form any link on any website, including links embedded throughout a particular website that is the same as the target website. For example, a retail website might want to redirect particular users from other pages within the website to different versions of product detail pages, or other pages on the retail website, that appeal to particular demographics or for the purposes of determining what versions of web pages appeal to various users). As a concrete example, a user may see an automated item recommendation appear while viewing products on the website. The item recommendation may include an embedded link that includes an experiment identifier. The described systems then redirect the user to a particular version of the item detail page for the item recommendation based on the triggering conditions, which could be set to correspond with a user's preferences. For example, if the retail website knows that a particular user is prone to purchasing items of a particular color, such as red, the described systems can be used to provide a link to an item detail page for the recommended item in the red color, rather than the default color. In addition to customizing user experience for a single user, and similar to above described examples, the system can also be set up to automatically provide different treatments to various users and determine which treatments are most successful using a variety of rules. The least effective treatments can then be reduced and possibly phased out.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for managing requests for content, comprising:

receiving multiple requests for a landing page of a web site at one or more processors;

determining by the one or more processors whether said requests include an experiment identification;

for requests having said experiment identification, automatically accessing multiple sets of triggering criteria associated with said experiment identification, each set of triggering criteria is associated with two or more landing pages that each have a weight, the weight associated with each landing page specifying a percentage chance that each particular landing page will be chosen as the landing page for a particular request, and said automatically accessing being performed by the one or more processors;

for requests having said experiment identification, automatically determining whether user landing contexts of said requests satisfy any of said sets of said triggering criteria, said automatically determining whether user landing contexts of said requests satisfy any of said sets of said triggering criteria is performed by the one or more processors;

for each request having user landing context that satisfies any of said sets of said triggering criteria, automatically identifying said set of triggering criteria satisfied by a respective landing context and choosing one landing page from the two or more landing pages associated with said set of triggering criteria satisfied by a respective landing context, said choosing is based on said weights for said landing pages, said automatically identifying and said choosing being performed by the one or more processors;

for each request having user landing context that satisfies one of said sets of said triggering criteria, automatically directing said request to said chosen landing page in response to said choosing, said automatically directing being performed by the one or more processors;

automatically analyzing results of said requests having user landing contexts that satisfy one of said sets of triggering criteria, said automatically analyzing being performed by the one or more processors; and automatically adjusting said one or more weights based on said analyzing results, said automatically choosing is performed before and after said automatically adjusting said one or more weights, said automatically adjusting being performed by the one or more processors.

2. A method according to claim 1, wherein:

said user landing contexts include information in said requests and information that is not in said request; and said requests are HTTP requests.

3. A method according to claim 1, further comprising:

accessing user identifications in a subset of said requests; and using said user identifications to access a data structure external to said requests, user landing contexts include information that is in said data structure.

4. A computer implemented method for managing requests for content, comprising:

receiving a request for a web page by one or more processors;

automatically determining by the one or more processors that said request includes an identification of an experiment;

identifying by the one or more processors a set of criteria associated with said experiment from multiple sets of criteria;

automatically determining by the one or more processors whether user landing context associated with said request satisfies said set of criteria;

automatically choosing a page from two or more pages associated with said set of criteria based on a weight associated with each page of said two or more pages if said user landing context associated with said request satisfies said set of criteria, said weight associated with each page specifying a percentage chance that each particular page will be chosen as the page for a particular request, said automatically choosing a page is performed by the one or more processors;

automatically providing said chosen page in response to said choosing, said providing being performed by the one or more processors; and automatically adjusting said weight based on results of at least a subset of said requests for content, said automatically choosing a page is performed before and after said automatically adjusting said rule, said automatically adjusting being performed by the one or more processors.

5. A method according to claim 4, wherein:

said automatically choosing said page includes choosing a destination for said request.

6. A method according to claim 4, wherein:
said automatically choosing a page includes randomly selecting a page based on said weights.

7. A method according to claim 4, wherein:
said user landing context includes information about a referring web site.

8. A method according to claim 4, further comprising:
accessing an indication of a user in said request; and
using said indication of said user to access a user data structure external to said request, said user landing context includes information that is in said user data structure.

9. A computing device, comprising:
at least one computing device processor;
a communication interface;
a storage device that includes triggering criteria and two or more treatments that indicate content to provide in response to an incoming request for content if at least a subset of the triggering criteria is satisfied by the incoming request, each treatment is associated with a weight; and
a memory device including instructions that, when executed by the at least one computing device processor, enable the computing device to:
receive multiple requests for a landing page of a web site;
determine whether the multiple requests include an experiment identification;
for requests having the experiment identification, automatically access multiple sets of triggering criteria associated with the experiment identification, each set of triggering criteria is associated with two or more landing pages that each have a weight, the weight associated with each landing page specifying a percentage chance that each particular landing page will be chosen as the landing page for a particular request;
for requests having the experiment identification, automatically determine whether user landing contexts of the requests satisfy any of the sets of the triggering criteria;
for each request having the user landing context that satisfies any of the sets of the triggering criteria, automatically identify the set of triggering criteria satisfied by a respective landing context and choosing one landing page from the two or more landing pages associated with the set of triggering criteria satisfied by a respective landing context;
for each request having the user landing context that satisfies one of the sets of the triggering criteria, automatically direct the request to the chosen landing page in response to the choosing;
automatically analyze results of the requests having the user landing contexts that satisfy one of the sets of triggering criteria; and
automatically adjust the one or more weights based on the analyzing results, the automatically choose performed before and after the automatically adjust the one or more weights.

10. The computing device of claim 7, further comprising:
access user identifications in a subset of the requests; and
use the user identifications to access a data structure external to the requests, the user landing contexts include information that is in the data structure.

11. The computing device of claim 9, wherein the user landing contexts include information in the requests and information that is not in the request and the requests are HTTP requests.

12. The computing device of claim 9, wherein the user landing context includes information about a referring web site.

13. The computing device of claim 9, wherein the instructions, when executed to choose one landing page, further cause the computing device to:
choose a destination for the request.

14. The computing device of claim 9, wherein the instructions, when executed to choose one landing page, further cause the computing device to:
randomly select a page based on the weights.

15. A non-transitory computer-readable storage medium storing instructions that, when executed by at least one computing device processor, cause a computing device to:
receive multiple requests for a landing page of a web site;
determine whether the multiple requests include an experiment identification;
for requests having the experiment identification, automatically access multiple sets of triggering criteria associated with the experiment, each set of triggering criteria being associated with two or more landing pages that each have a weight, the weight associated with each landing page specifying a percentage chance that each particular landing page will be chosen as the landing page for a particular request;
for requests having the experiment identification, automatically determine whether user landing contexts of the requests satisfy any of the sets of the triggering criteria;
for each request having the user landing context that satisfies any of the sets of the triggering criteria, automatically identify the set of triggering criteria satisfied by a respective landing context and choose one landing page from the two or more landing pages associated with the set of triggering criteria satisfied by a respective landing context, the choosing is based on the weights for the landing pages;
for each request having the user landing context that satisfies one of the sets of the triggering criteria, automatically direct the request to the chosen landing page in response to the choosing;
automatically analyze results of the requests having the user landing contexts that satisfy one of the sets of triggering criteria; and
automatically adjust the one or more weights based on the analyzing results, the automatically choosing is performed before and after the automatically adjusting the one or more weights.

16. The non-transitory computer-readable storage medium of claim 15/, wherein the instructions, when executed by at least one computing device processor, further cause the computing device to:
access user identifications in a subset of the requests; and
use the user identifications to access a data structure external to the requests, the user landing contexts include information that is in the data structure.

17. The non-transitory computer-readable storage medium of claim 15, wherein the user landing contexts include information in the requests and information that is not in the request, and wherein the requests are HTTP requests.

18. The non-transitory computer-readable storage medium of claim 15, wherein the user landing context includes information about a referring web site.

19. The non-transitory computer-readable storage medium of claim 15, wherein the instructions, when executed to choose one landing page further cause the computing device to:

choose a destination for the request.

20. The non-transitory computer-readable storage medium of claim 15, wherein the instructions, when executed to choose one landing page further cause the computing device to:

randomly select a page based on the weights.

\* \* \* \* \*